United States Patent
Nicollier et al.

(10) Patent No.: US 9,218,743 B2
(45) Date of Patent: Dec. 22, 2015

(54) NAVIGATION AID INSTRUMENT FOR AIRCRAFT

(71) Applicant: Omega SA, Biel/Bienne (CH)

(72) Inventors: Claude Nicollier, Lausanne (CH); Emmanuel Fleury, Moutier (CH); Reto Galli, Bern (CH)

(73) Assignee: Omega SA, Biel/Bienne (CH)

( * ) Notice: Subject to any disclaimer, the term of this patent is extended or adjusted under 35 U.S.C. 154(b) by 0 days.

(21) Appl. No.: 14/452,386

(22) Filed: Aug. 5, 2014

(65) Prior Publication Data

US 2015/0035688 A1 Feb. 5, 2015

Related U.S. Application Data

(62) Division of application No. 13/131,145, filed as application No. PCT/EP2009/064927 on Nov. 10, 2009.

(30) Foreign Application Priority Data

Nov. 25, 2008 (EP) ................................... 08169905

(51) Int. Cl.
*G08G 1/01* (2006.01)
*G08G 5/02* (2006.01)
(Continued)

(52) U.S. Cl.
CPC *G08G 5/02* (2013.01); *B64D 43/00* (2013.01); *G01C 23/00* (2013.01)

(58) Field of Classification Search
CPC ... G08G 5/0021; G08G 5/0013; G08G 5/025; G08G 5/0091; G08G 5/065; G08G 5/0078; G08G 5/0086; B64D 45/00; B64D 43/00; G01C 23/00; G01C 23/005; G01C 5/005
USPC .................. 340/945, 947–951, 963, 967–979
See application file for complete search history.

(56) References Cited

U.S. PATENT DOCUMENTS 4,663,627 A 5/1987 Dennis
5,359,326 A 10/1994 Bivens et al.
(Continued)

FOREIGN PATENT DOCUMENTS

GB 2 127 656 4/1984
WO 95/15499 6/1995
WO 2007/005658 1/2007

OTHER PUBLICATIONS

International Search Report issued in corresponding application PCT/EP2009/064927, completed Mar. 24, 2010 and mailed Apr. 27, 2010.

(Continued)

*Primary Examiner* — George Bugg
*Assistant Examiner* — Sharmin Akhter
(74) *Attorney, Agent, or Firm* — Griffin and Szipl PC

(57) ABSTRACT

Navigation aid instrument for an aircraft pilot including:
a first display device (R3) extending horizontally, wherein the center of the display device embodies the longitudinal axis (X) of the aircraft, a mobile marker can move on either side of the center of the first display device (R3) indicating the aircraft flight direction relative to the ground, and the mobile marker is further away from the center of the display device (R3) the further the aircraft drifts from the rectilinear flight path, and/or
two left (R2) and right (R1) display devices that extend vertically at a distance from each other and have the function of indicating the angle of inclination of the aircraft wings relative to the horizontal respectively on the left side or right side of the aircraft, wherein a mobile marker can move either along the left display device (R2), or along the right display device (R1) to indicate to the pilot which way his aeroplane is inclined and the value of the inclination is higher the further the mobile marker is away from the top of the left (R2) or right (R1) display device concerned.

10 Claims, 1 Drawing Sheet

(51) Int. Cl.
*G01C 23/00* (2006.01)
*B64D 43/00* (2006.01)

(56) References Cited

U.S. PATENT DOCUMENTS

2003/0127557 A1* 7/2003 Anderson et al. ............. 244/1 R
2006/0212182 A1  9/2006 Shaw
2008/0208400 A1* 8/2008 Bouchet et al. ................. 701/4

OTHER PUBLICATIONS

Angle of Attack, Wikipedia, http://en.wikipedia.org/wiki/Angle_of_attack?0ldid=127448130 (downloaded Apr. 23, 2015).

* cited by examiner

NAVIGATION AID INSTRUMENT FOR AIRCRAFT

This is a divisional application of U.S. patent application Ser. No. 13/131,145, filed on May 25, 2011, which is the National Phase Application in the United States of International Patent Application PCT/EP2009/064927 filed Nov. 10, 2009, which claims priority on European Patent Application No. 08169905.0, filed on Nov. 25, 2008. The entire disclosures of the above patent applications are hereby incorporated by reference.

FIELD OF THE INVENTION

The present invention concerns a navigation aid instrument for an aircraft. More specifically, the invention concerns an instrument for assisting the pilot of an aircraft during the approach and landing phases.

BACKGROUND OF THE INVENTION

The purpose of the project named Solar Impulse is to fly an aeroplane powered solely by solar energy captured by a multitude of photoelectric cells distributed over the entire surface of the aircraft. To achieve this challenge, the apparatus must be very light and have a large wing span, typically on the order of 61 meters, i.e. a wing span comparable to an Airbus A340 which weighs several hundred tonnes.

It goes without saying that there are enormous differences of control between these two types of aircraft. Without going into detail, it should be noted that the approach and landing phases are fundamentally different for piloting these two types of aircraft. A large heavy aeroplane, which is heavily motorised, has considerably fewer constraints during approach and the final landing phase. In fact, any crosswind, even a relatively strong crosswind, does not cause any great problems of stability, and the angle of approach can easily be corrected since the pilots have the ability to step on the gas and negotiate a slight turn. This being so, even if the technique and power of a large airliner offer a relatively high safety margin, the final approach and landing nonetheless remain complex flight phases requiring the full attention of the pilots, who have to control a large number of parameters within a short period of time.

The Solar Impulse pilot, while having to control the same parameters as in a conventional aircraft, will not have a power reserve enabling him to easily correct the path, particularly in the last hectometers preceding touchdown on the runway. Because of the extremely reduced weight and large wing span of this aircraft, it will be very sensitive to side winds and will only have a very limited possibility for manoeuvre during the final approach. It was therefore necessary to find a way of giving the pilot information relating to the angle of approach and the inclination of the wings of his aircraft.

As regards the angle of approach, it can be said that when an aeroplane wishes to land, it is normally directed towards the threshold of the runway in a straight line. However, it is of course sensitive to crosswinds which may cause it to deviate from its path. This is how, in the event of crosswind, the pilot, if he looks straight ahead, will notice that the runway is slightly to the left, or to the right relative to the nose of the aircraft. The power of the engines of a conventional aircraft will enable the pilot to correct the angle between the rectilinear path and the runway threshold.

For a Solar Impulse type aircraft, the pilot has no power reserve and he must therefore prepare the approach either by adhering as closely as possible to the straight line, or by anticipating the drift of the aircraft due to the crosswind as early as possible. To do so, the pilot, who is already extremely occupied with other approach manoeuvres, must easily be able to see the correction that has to be made to his path in order to approach the runway threshold properly. Moreover, he must also be able to know whether the wing is perfectly horizontal, because, as it is very large, it is liable to touch the runway on landing if it is inclining too far on one side or the other. It should be realised that with a wing span of 61 meters, it is practically impossible for the pilot to visualise an inclination of the wings of one or two meters relative to the perfect horizontal.

SUMMARY OF THE INVENTION

It is an object of the present invention to answer the aforementioned requirements by providing a navigation aid instrument which allows an aircraft pilot to assess, in a simple stroke, the angle of inclination of the wings of his aircraft and the drift relative to the rectilinear direction which will bring him to the runway threshold.

The invention therefore concerns a navigation aid instrument for an aircraft pilot, characterized in that it includes a horizontally extending display device, wherein the centre of said display device embodies the longitudinal axis of the aircraft, a mobile marker that can move on either side of the centre of the display device indicates the flight direction of the aircraft relative to the ground, i.e. the angle formed by the longitudinal axis of said aircraft and the horizontal component of the velocity vector of said aircraft, wherein the angle is positive on the right side of the longitudinal axis of the aircraft, and, the more the aircraft drifts from its rectilinear flight path, the further the mobile marker moves away from the centre of the display device.

According to a complementary feature of the invention, the mobile marker moves on a scale comprised between −15° and +15°.

According to a particular embodiment of the invention, the display device is achieved using a row of light emitting diodes, wherein the centre of said row of diodes embodies the longitudinal axis of the aircraft, and one diode in the row of diodes lights up to the right or left of the central diode to indicate to the pilot the flight direction of the aircraft relative to the ground. The display resolution provided by the row of diodes will be at least ±1° and preferably ±0.4°. It will be clear that this resolution is not absolute. It depends upon the distance between the pilot's head and the instrument. Thus, it is even possible for the resolution to be different for different pilots. One diode in the row of diodes will indicate a drift of one degree between the longitudinal axis of the aircraft and the horizontal component of the velocity vector of said aircraft.

According to another embodiment of the invention, the aircraft navigation aid according to the invention includes two, left and right, vertically extending display devices at a distance from each other and having the function of indicating the angle of inclination of the aircraft wings relative to the horizontal respectively on the left side or right side of said aircraft, wherein the angle of inclination is positive when the aircraft wings are inclined to the right side, and a mobile marker can move either along the left display device, or along the right display device to indicate to the pilot which way his aeroplane is inclined and the value of the inclination.

According to a particular embodiment of the invention, the two, left and right display devices are each made using a row of light emitting diodes, wherein one diode in one of the left or right diode rows lights up to indicate the side on which the aeroplane is inclined and by how many degrees the wings are inclined relative to the horizontal. The display resolution provided by the two rows of diodes will preferably be ±1°, with one diode of either of the two rows of diodes indicating a one degree inclination of the aircraft. Advantageously, the two vertical left and right display devices supply an indication of the inclination of the wings comprised between 0° and 5°.

BRIEF DESCRIPTION OF THE DRAWINGS

Other features and advantages of the present invention will appear more clearly from the following detailed description of an example embodiment of the navigation aid instrument according to the invention, this example being given solely by way of non-limiting illustration with reference to the annexed drawing, in which.

DETAILED DESCRIPTION OF THE PREFERRED EMBODIMENTS

The Solar Impulse pilot will have to keep the angle of inclination of the wings close to zero when flying level and very low (typically less than 5°) in the turns. Moreover, the angle formed by the aeroplane's flight direction relative to the ground must be very precisely controlled. It is sometimes difficult to determine which direction the aeroplane is travelling in, which significantly increases the workload of the pilot, particular during the approach phases. The low speed of the aircraft and the high side slip angle even with a moderate crosswind add additional difficulty. A conventional instrument panel does not provide precise information concerning the angle of inclination and velocity vector direction for properly carrying out all of the flight phases. It has thus been deemed necessary to provide an instrument providing a display of these parameters that is easy to read, in particular a precise indication of the angle of inclination in proximity to zero degrees and the flight direction relative to the ground, to assist the pilot during the final approach to landing.

Figure 1:
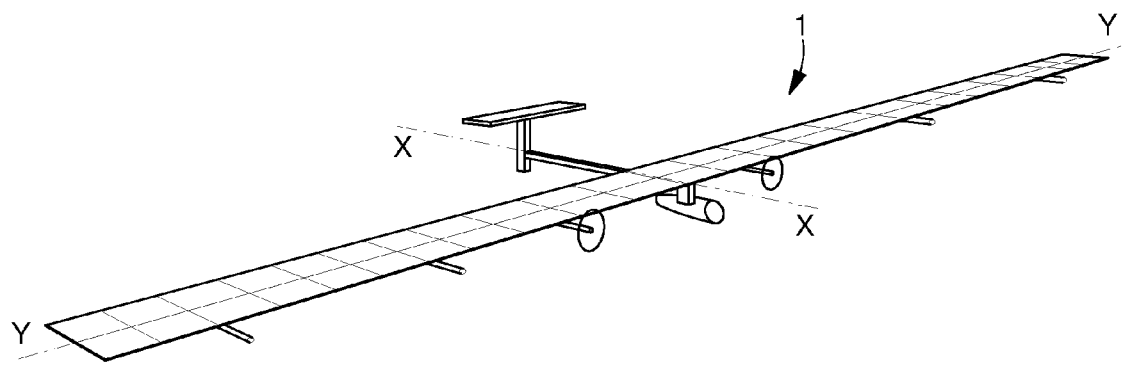
FIG. 1 is a perspective view of an aircraft fitted with the navigation aid instrument according to the invention.

The angle of inclination will be designated ($\Phi$), i.e. the angle between the transverse axis (Y) of aeroplane 1 (FIG. 1) and the horizontal plane. $\Phi$ is positive when the aircraft leans to the right. Moreover, the side slip angle will be designated ($\beta$), in other words the angle between the longitudinal axis (X) of the aircraft and the horizontal component of the air velocity vector. $\beta$ is positive on the right side of longitudinal axis X of the aircraft. Finally, the angle of drift will be designated ($\Omega$), i.e. the angle between the horizontal component of the air velocity vector and the runway on the ground. $\Omega$ is positive to the right of the air velocity vector.

The main function of the aircraft navigation aid instrument according to the invention is to provide a clear view of the angle of inclination $\Phi$ of the aircraft with a precision of one degree for the first five positive or negative degrees of inclination. Beyond 5 degrees, the angle of inclination no longer needs to be indicated by the instrument according to the invention, given that it can be assessed with sufficient precision by the instruments of a conventional instrument panel. Another function of the aircraft navigation aid instrument according to the invention is that it allows the pilot to monitor and correct the flight direction relative to the ground, or in other words the angle resulting from the sum of the side slip angle $\beta$ and the drift angle $\Omega$. Only the horizontal component of the velocity vector will be displayed, which will allow the pilot to be informed as to his flight direction in terms of azimuth but not elevation. Finally, the instrument according to the invention must be able to warn the pilot when the angle of inclination $\Phi$ reaches 6° (this value can be adjusted as required). This alarm must be both visual and sensory. The alarm will therefore be produced in the vibrating sleeves of the pilot's flight suit. In other words, if the wing leans too far to the right, the right sleeve will vibrate, indicating to the pilot that he must correct the inclination of the left wing.

The pilot must be able to be informed of all the aforementioned parameters (angle of inclination and flight direction) clearly and without any possible source of error, both day and night. This objective can be achieved with suitable sizing and a careful choice of colours and symbols.

Figure 2:
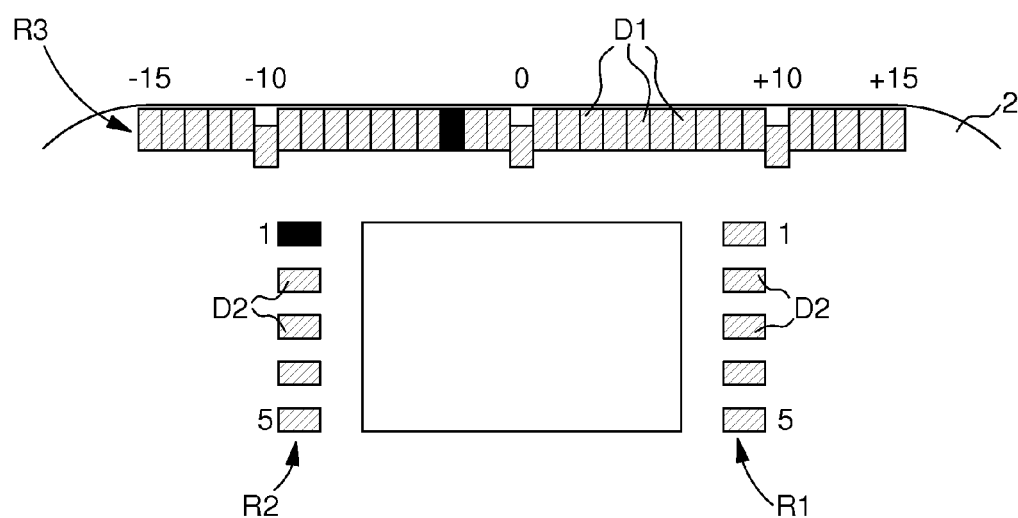
FIG. 2 is a schematic view of the navigation aid instrument according to the invention including a horizontal row of light emitting diodes for indicating a drift between the longitudinal axis of the aircraft and the horizontal component of the velocity vector of said aircraft and two vertical rows of light emitting diodes for indicating the inclination of the aircraft wings relative to the horizontal on the left side or right side of said aircraft.
Figure 3:
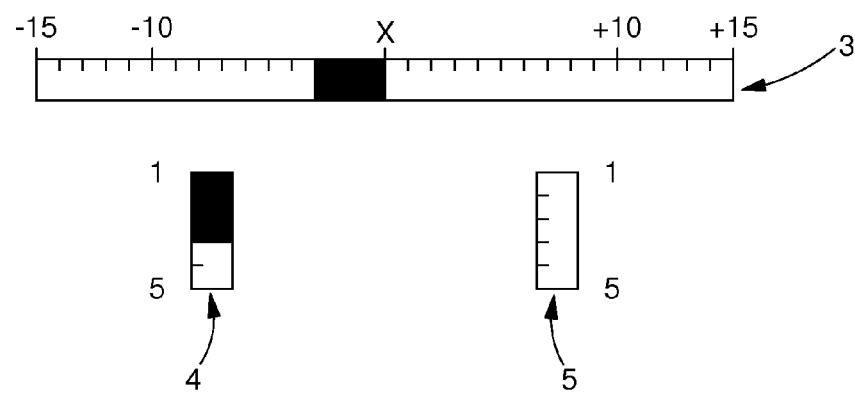
FIG. 3 is a similar view to that of FIG. 2, where the light emitting diodes are replaced by liquid crystal display cells.

The navigation aid instrument according to the invention is based on rows of coloured light emitting diodes arranged on the instrument panel. FIG. 2 below illustrates the desired arrangement.

The rows of light emitting diodes indicating the angle of inclination and flight direction are arranged on the top part of instrument panel 2. Diodes D2 dedicated to indicating the angle of inclination are separated by a space of 5 mm. There are five in each row, namely one diode per degree of inclination.

A precise indication of the angle of inclination is provided by two vertical rows of light emitting diodes, a right row R1 and left row R2. One or several diodes, namely one diode per degree of inclination, which play the part of a mobile marker by producing a bright blue light, will light up in succession to indicate an inclination of the wing to the left side or right side under the horizon. Thus, if the aeroplane is flying perfectly horizontally, none of diodes D2 will light up. However, if the right wing of the aircraft is inclined by 3°, three diodes D2 of right row R1 will light up in succession and remain lit up until the pilot has re-established the attitude of the aeroplane by correcting the inclination in the opposite direction. The angle of inclination is displayed on a range of ±5°. The number of diodes D2 lit up from the top of a row R1, R2 indicates the value of the angle in degrees up to 5°. In the example shown in the drawing, the first diode starting from the top of row R2 of diodes D2 is lit up, indicating an inclination of 1° of the aircraft wings on the left side.

If the angle of inclination reaches 6° or more (adjustable value), the entire row of five diodes on the right or left side concerned will start to flash at a frequency of 2 Hz and the signal intended to produce the alarm in the vibrating sleeve of the pilot's flight suit will be generated.

Diodes D1 for supplying a precise flight direction indication are arranged in a horizontal row R3 arranged above the two rows R1 and R2 of diodes D2. The flight direction reading precision must not be less than 1°. A diode D1 is therefore provided for each degree of drift of the aircraft flight direction relative to the ground. The horizontal row R3 of diodes D1 will have a pale blue background colour from which a diode D1, playing the part of mobile marker, will stand out by indicating in bright green the direction of the horizontal component of the velocity vector relative to the ground. For indication of the velocity vector direction, the measuring range will be ±15° given that the pilot's eyes are around 70 cm from the instrument panel 2 and that the top right part of the panel measures 35 cm. For flight directions greater than 15° relative to the longitudinal axis of the aircraft, the bright green diode will remain lit up permanently at the end of row R3 of diodes D1 on the appropriate side. The diode marking the zero in row R3 of diodes D1 and the diodes marking −10° and +10° in the same row R3 of diodes D1 could be staggered (see FIG. 2) for example downwards to provide visual markings to the pilot. In the example shown in the drawing, it is seen that the third diode to the left of the centre of row R3 of diodes D1 is lit up, indicating therefore a drift of −3° of the longitudinal axis X of the aircraft relative to the rectilinear flight direction.

In flight, all of the diodes will be dark, with the exception of:

- horizontal row R3 of diodes D1 which will always be illuminated in a pale blue colour, thus providing the pilot with a lateral reference axis
- one diode D1 of horizontal diode row R3 will indicate in bright green the direction of flight (if the aircraft is flying in a perfectly rectilinear manner only diode D1 at the centre of row R3 will be lit up);
- the two vertical rows R1 and R2 of diodes D2 will indicate in a bright blue colour the value of the the angle of inclination up to 5°. The five diodes D2 of a given row will flash in blue for an angle of inclination equal to or higher than 6°.

Two dimmer switches are provided, one for adjusting the pale blue background of the horizontal row R3 of diodes D1, and the other for regulating the brightness of the brightest green velocity vector indicator and the brightest blue angle of inclination indicator.

It will be clear that the navigation aid devices according to the invention, based on the use of rows of light emitting diodes could be replaced, for example, by liquid crystal display devices. Thus a liquid crystal display 3 of elongated rectilinear shape could be arranged horizontally indicating the aircraft flight direction relative to the ground, i.e. the angle formed by the longitudinal axis of said aircraft and the horizontal component of the velocity vector of the aircraft. The liquid crystal display could be backlit and light coloured when the aeroplane is flying in a straight line. The liquid crystal display could then gradually get darker from the centre towards the left or right according to whether the aircraft is moving away from the rectilinear path to the left or right. Likewise, two display screens of elongated rectilinear shape 4 and 5 could be arranged vertically indicating the angle of inclination of the aircraft wings relative to the horizontal. These screens could be backlit and light coloured when the aeroplane is flying on the horizontal. One of the two screens would then gradually get darker from the top according to whether the aircraft wings inclining to the right or the left.

The invention claimed is:

1. A navigation aid instrument for an aircraft pilot comprising:
   a left display device and a right display device, wherein the left and right display devices indicate a left-right angle of inclination of both aircraft wings relative to a horizontal,
   wherein the angle of inclination indicates respectively whether the wings are inclined on a left side or a right side of the aircraft,
   wherein the angle of inclination is positive when the aircraft wings are inclined on the right side,
   wherein a mobile marker is movable only along the left display device or only along the right display device to indicate to the pilot the side the aeroplane that is inclined, wherein the left and the right display devices extend vertically on opposite sides relative to an instrument on the instrument panel of the aircraft and at a distance from each other,
   wherein the larger the angle inclination is, the further the mobile marker is away from the top of the left or the right display device concerned, and
   wherein the resolution of the angle to be displayed by the two display devices is ±1° relative to the position that the aircraft wings extend horizontally.

2. Navigation aid instrument according to claim 1, wherein the left and right display devices supply an indication as to the inclination of the aircraft relative to the horizontal comprised between 0° and 5°.

3. Navigation aid instrument according to claim 1, wherein the two left and right display devices each include a row of light emitting diodes, wherein one or several diodes in one or other of the right or left diode rows lights up to provide the pilot with an indication of the inclination of the aircraft wings relative to the horizontal, the diodes light up one after the other from the top to the bottom of the row concerned.

4. Navigation aid instrument according to claim 2, wherein the two left and right display devices each include a row of light emitting diodes, wherein one or several diodes in one or other of the right or left diode rows lights up to provide the pilot with an indication of the inclination of the aircraft wings relative to the horizontal, the diodes light up one after the other from the top to the bottom of the row concerned.

5. Navigation aid instrument according to claim 3, wherein one diode in the diode row indicates a difference of one degree between the transverse axis of the aircraft and the horizontal.

6. Navigation aid instrument according to claim 4, wherein one diode in the diode row indicates a difference of one degree between the transverse axis of the aircraft and the horizontal.

7. Navigation aid instrument according to claim 1, wherein each of the left and right display devices is formed by a liquid crystal display cell that extends vertically and that is in a light coloured state when the aircraft is flying horizontally, wherein the left or right display device concerned gradually gets darker from the top to the bottom as the aircraft wing inclines under the horizon on the corresponding side.

8. Navigation aid instrument according to claim 1, wherein it generates an alarm in the pilot's flight suit when the inclination of the aircraft wing relative to the horizontal reaches a predetermined value.

9. Navigation aid instrument according to claim 8, wherein the alarm is triggered when the inclination of the wing is greater than or equal to 6°.

10. Navigation aid instrument for an aircraft pilot, including two left and right display devices according to claim 1.

* * * * *